United States Patent [19]

Canty

[11] Patent Number: 4,965,601

[45] Date of Patent: Oct. 23, 1990

[54] HIGH PRESSURE/TEMPERATURE CAMERA

[76] Inventor: Thomas M. Canty, 483 Fruitwood Terrace, Williamsville, N.Y. 14221

[21] Appl. No.: 416,706

[22] Filed: Oct. 3, 1989

[51] Int. Cl.$^5$ .............................................. G03B 37/00
[52] U.S. Cl. ........................................ 354/63; 354/81; 358/99; 358/100
[58] Field of Search ...................... 354/63, 76, 81, 293, 354/295; 358/99, 100; 73/323, 327, 328, 331; 220/82 A

[56] References Cited

U.S. PATENT DOCUMENTS

| | | | |
|---|---|---|---|
| 2,744,487 | 5/1956 | Moore et al. | 73/323 |
| 3,229,851 | 1/1967 | Olsen | 73/323 |
| 3,837,226 | 9/1974 | Kawawa | 73/331 |
| 4,245,566 | 1/1981 | Shimansky et al. | 220/82 R X |
| 4,346,404 | 8/1982 | Gantenbrink | 358/99 |
| 4,809,862 | 3/1989 | Canty | 220/82 A |

Primary Examiner—Brian W. Brown
Attorney, Agent, or Firm—James J. Ralabate

[57] ABSTRACT

A camera viewing unit for viewing the inside of a reaction vessel or the like is the invention disclosed. This viewing unit has a fixed lens positioned in front of the camera lens. The camera is focused by moving the fixed lens. The camera has a fused lens in front of the fixed lens; this fused lens minimizes corrosion of the unit. There are also easy alignment means to ensure a level picture is transmitted.

15 Claims, 1 Drawing Sheet

HIGH PRESSURE/TEMPERATURE CAMERA

This invention relates to a means for viewing the interior of a vessel and, more particularly, to a novel system and apparatus for viewing with a camera structure.

BACKGROUND OF THE INVENTION

There are presently in use containing vessels used in different industries such as chemical, food processing, metallurgical and the like. In vessels of this nature chemical reactions are conducted, polymerization procedures are carried out, beer is brewed, metals or other materials are mixed, and other procedures are carried out under controlled temperature and pressure conditions. It is necessary in each of these procedures to control and determine the progress and alter or adjust the reaction conditions when necessary. This control is generally facilitated by a viewing window provided in the side of the reaction vessel. By viewing through this window, the operator can determine color changes, liquid levels, or other visually-determinable factors taking place within the vessel. These viewing windows can fail after continued or prolonged usage and could cause serious injury to the operator. Window failure can be caused by several factors such as corrosion, gasket failure, glass fractures, high pressures or uneven glass loading due to attachment stresses and the like.

There have been some attempts to improve the durability of viewing windows and some improvements have been disclosed in U.S. Pat. Nos. 2,744,487; 3,299,851; 3,837,226 and 4,245,566. Each of these patents disclosed a different approach but all lacked the feature of providing a corrosion-reducing system or a structure that substantially strengthens the window after continued usage. None of these patents provided viewing windows sufficient to prevent rupturing of the window when used in high pressure vessels that are exposed to corrosive conditions.

U.S. Pat. No. 4,809,862 (Canty) provided a safety viewing window made up of an optically clear window having a transparent disc fused to a metal frame. A laminate was then overcoated over the fused disc and frame to provide a corrosion-resistant viewing window. The viewing window has means for securing it to the vessel in a pressure-tight manner. The unit has found wide acceptance but a unit was needed to record activities within the vessel or to provide observation means at a remote location. There are situations requiring controlling and recording process parameters as they occur for viewing immediately or at a later date. There are other situations when the operator is absent from the vessel site and process progress needs to be viewed or recorded. In other situations, vessel reactions could cause explosions or other dangerous reactions. To accommodate these situations, the present invention provides a camera-viewing structure allowing viewing or recording at a remote location where information can be digitized if desired to be analyzed or viewed at a later date. Window viewing by an observer can only provide instant viewing. If it was desired to play back a chemical reaction to determine color changes, liquid levels or other parameters, instant viewing through any type window would not provide this opportunity. A camera viewing device would afford substantial advantages in addition to safety.

In standard viewing in a high pressure/high temperature system, users have been limited to makeshift methods. Generally, to view the interior of a vessel at a remote location, the user would have to mount a CCD or CCTv Camera onto an existing sightglass window. They would then encounter some or all of the following problems that would render the system ineffective:

(1) The sightglass and CCD lens would become dirty due to dirt external to the vessel.

(2) The process fluid or vapors would leak out or flow out due to a sightglass breaking or leaking. This would then destroy the electronics making the system worthless.

(3) Reflection from room lighting would cause the vessel view to disappear.

The structures of a camera device on a reaction vessel could easily become corroded and could fail. Uneven glass loading due to uneven bolt or gasket stresses can cause cracking and leakage. Also, corrosive chemicals during extended usage could cause failure of these mounting structures or failure of the camera being used. The camera systems of the prior art are cumbersome, oversized and in many instances tend to reflect light and cause image distortion. In addition, focusing and manipulating of the camera to provide optimum usage has been difficult when using prior art devices. Therefore, while some degree of improvement is provided by camera viewing heretofore used, none of these systems provide an adequate system for reliable and extended usage.

SUMMARY OF THE INVENTION

An object of this invention is to provide a safety camera viewing device which is devoid of the above-noted disadvantages.

It is another object of this invention to provide a lens system which has a significant enhancement in view angle over the prior art. In addition, the insertion style lenses create an added dimension of bringing the view past a nozzle or through a valve.

Another object of this invention is to provide a viewing system for vessels where the operator can monitor at a remote and safe location.

A further object of this invention is to provide a leak-tight viewing system for the interior of low or high pressure vessels where several criteria relating to the contents can be determined, controlled and monitored.

A still further object of this invention is to provide a camera viewing system that can be easily focused and adjusted after being installed in a vessel.

Another still further object of this invention is to provide a camera viewing system where visual observations can be recorded, digitized and analyzed during or after viewing.

A yet still further object of this invention is to provide a camera viewing system for viewing the interior of a vessel that will be substantially resistant to corrosion, cracking, vapor or liquid leakage and deterioration upon extended usage.

Still yet another object of this invention is to provide a camera viewing system with a fused lens that is relatively easy to use, minimizes reflections and will allow a precise and non-distorted view of a vessel interior and its contents.

A further object is to provide an easily portable camera viewing system for use in vessels such as chemical reactors, fermenting chambers, foaming vessels, agitation or mixing vessels and the like.

Another further object is to provide a camera viewing and monitoring means helpful in determining content particle size, fluid density and other essential criteria of materials in a pressure vessel.

The foregoing objects and others are accomplished in accordance with this invention by providing a CCD or CCTv Camera viewing means that is fixed in place and yet can be adjusted according to the precise object to be viewed. The camera viewing means of this invention can be used in high or low pressure vessel systems and high and low temperature areas to view the interior with a minimum of risk from a safety standpoint. It can also be used conveniently in standard viewing of non-pressurized vessel interiors such as in baking, mixing vessels and the like.

The unit of this invention comprises a CCD, CCTV or other suitable camera means having a fixed lens. A unit-vessel attachment structure is mounted on the front portion of the camera forward of the lens. This attachment structure comprises at its front face a fused lens. The lens can be made from any suitable material such a inorganic glasses, acrylics, other polymeric materials, boron glass and other suitable, optically clear materials. It is preferred, however, for the present invention, that a substantially strong safety glass be used. The fusing process followed in the present invention is similar to that process described in *Glass Engineering Handbook, Third Edition*, Chapter 5, 1984 Library of Congress, ISBN 0-07-044823-X by G. W. McLellan and E. B. Shand. If desired, the fused lens can be laminated by a process disclosed in this same *Glass Engineering Handbook*, pages 12–15. Both the fusing and lamination process disclosed in this *Glass Engineering Handbook* are hereby incorporated by reference in the present disclosure. The laminate can be of any suitable material such as pyrex, quartz, mica or other materials to suit the desired strength or corrosion-resistance needs. The camera not the lens is moved to focus the image in the present invention. The camera is fixed in the vessel attachment housing in a manner that permits the camera lens to see through an aperture in the vessel attachment housing through the fused lens which covers the front most portion of this aperture. Surrounding the aperture is a shoulder having an outer threaded periphery. This threaded periphery screws into a mating opening in a vessel to be viewed. The preferred method of focusing the camera is to turn the camera upon the threaded portion of the fixed lens housing which in effect moves the camera closer or farther from the front fixed lens. Care must be taken in focusing not to unscrew the attachment means too far out so that the camera falls out of the vessel connection. Lens extenders are readily available to avoid this problem and allow close-up viewing. Leveling or orientation of the camera view can be adjusted by loosening the set screw on the side of the hex plug. As an alternate, a quick change connection can be made by using a plunger spring instead of a set screw. The plunger would fit in a recess. The camera is then leveled so that a level picture will be transmitted and the camera is kept in place by tightening the set screw. The camera fixed lens assembly will turn in relation to the fused lens and vessel when the set screw is loosened. Once the camera is oriented properly, it is fixed in a level and focused mode by this set screw or plunger spring which holds the fixed lens in position.

DETAILED DESCRIPTION OF THE DRAWING AND THE PREFERRED EMBODIMENTS

Figure 1:
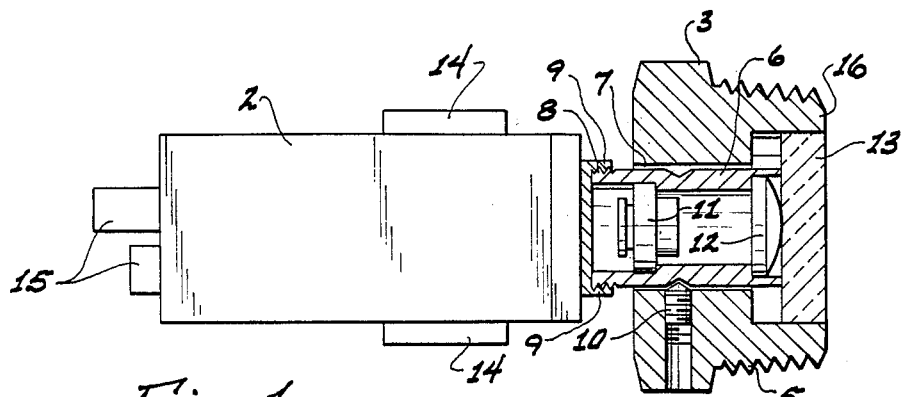
FIG. 1 is a side plan view of the camera viewing unit of this invention.

In FIG. 1 a camera 2 is attached by a threaded portion 8 to a fixed lens housing 6. A CCD Camera is preferred for use in the device of this invention. However, any other suitable camera may be used. CCD is an acronym for Charged Coupled Device. This CCD Camera is used rather than a vidicon tube. A typical CCD Camera useful in this invention is a Sony Camera identified as Sony Model No. XC-711. In use, attachment means 3 is attached to a vessel 4 (see FIG. 3) by screwing threaded hex plug portion 5 into a threaded female portion in vessel 4. Other suitable means of attachment are flanged, tri-clamps, straight thread O-ring seals, etc. Once attachment means 3 is fixed into a threaded aperture in vessel 4, the fixed lens housing 6 is screwed into the CCD Camera 2 at its front lens section at screw portion 8. The fixed lens housing 6 already is mounted in the opening 7 of attachment means or hex plug 5. In the quick change design, the plunger spring allows quick change and movement of camera 2 and fixed lens housing 6. Fixed lens housing 6 has a tubular configuration with a back threaded section 8 which conveniently screws into the camera lens fitting 9. In focusing the camera, threaded section 8 is loosened or tightened until the proper focal length or focus is obtained. The focused view is leveled by loosening set screw 10 and rotating camera 2 and fixed lens housing 6. When the focusing and orienting is completed, set screw 10 is tightened to fix the camera 2 and fixed lens housing 6 in position. The fixed lens housing 6 has at its rear section closest to the camera a lens steel housing 11 which is fixed to housing 6. In the front section of lens housing 6 is a glass lens 12 which abuts the inner face of fused lens 13. Fused lens 13 is a fused glass to metal (plug 3) plano-plano lens which hermetically seals the fixed lens 12 and does not allow any vapors to enter the viewing unit. The preferred focusing is accomplished by turning the camera 2 upon threaded section 8 of fixed lens housing 6. Camera 2 has mounting plates 14 in the event it is desired to connect the camera to some other support. In the rear portion of camera 2 are video and power connections 15 for connecting the camera viewing unit to the appropriate electrical connections. Fused lens 13 is preferably made of soda lime and is fused on and flush with the metal surface 16 of attachment means 3 by a process as above described in *Glass Engineering Handbook*. If desired, a laminate overcoating may be formed on the outside face of fused lens 13 for additional protection from the corrosive effects of the vessels 4 contents. A typical laminating process and laminating materials are described in U.S. Pat. No. 4,809,862. At the rear of camera 2 as noted earlier are video and power connections 15 which permit the source of electrical energy for transmission of the composite video by coaxel cable or fiber optics. These electrical connections 15 also provide for electrical connections required for other manipulations of the camera 2.

Figure 2:
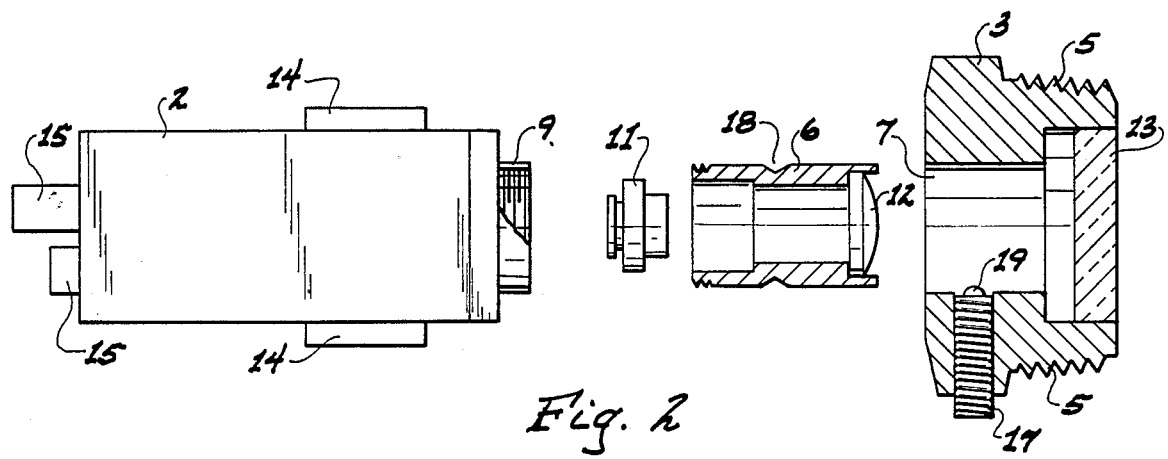
FIG. 2 is a side exploded view of the camera viewing unit of this invention.

FIG. 2 shows an exploded view of the camera viewing unit of this invention whereby attachment means 3 is detached from fixed lens housing 6. Housing opening 7 permits fixed lens housing 6 to be inserted therein and fixed in place by a set screw 10 of FIG. 1 or, alternatively, a plunger spring tightening means 17 as shown in FIG. 2. In the embodiment shown in FIG. 2, a groove 18 is positioned in the outside wall of fixed lens housing 6. Groove 18 receives and locks with ball tightener 19 at the top of plunger spring 17 when the housing 6 is fixed in position in aperture or opening 7. Camera 2 may be focused as described above by turning the camera 2 upon threaded fixed housing section 8 or by turning the fixed housing 6 upon this same threaded section 8.

Figure 3:
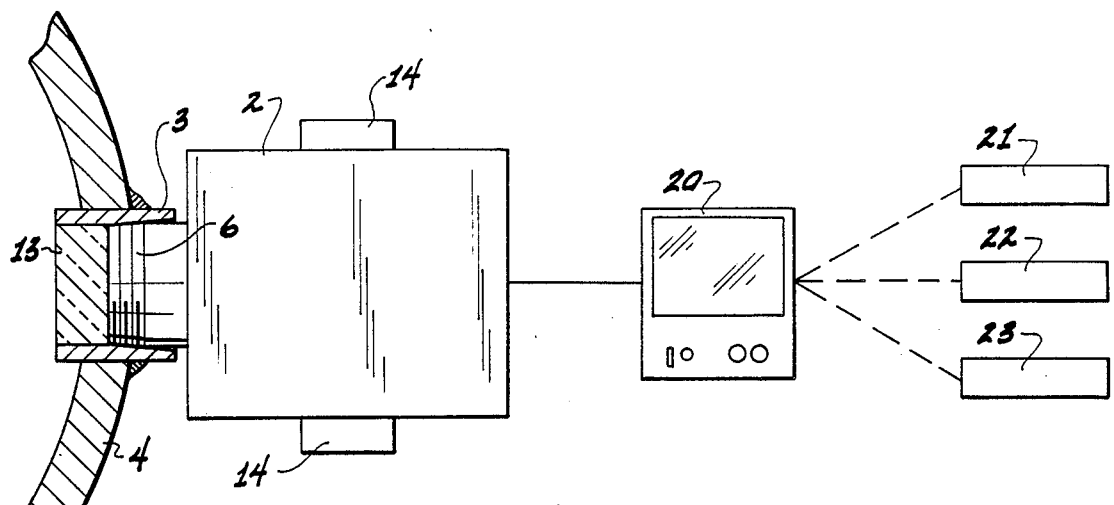
FIG. 3 is a schematic view of the system wherein the camera viewing unit of this invention is used.

In FIG. 3 a schematic view of a system utilizing the camera unit of this invention is illustrated. The unit attachment means 3 is connected to the side of vessel 4 in a manner that camera 2 can view the interior of vessel 4. Threaded section 5 of attachment means 3 is screwed or threaded into and through the side of vessel 4 whereby fused lens 13 is in direct visual and physical contact with the vessel interior. Fixed lens housing 6 connects the camera 2 to the interior of attachment means 3 and is fixed in place by set screw 10. The unit is electrically connected to a source of electrical energy and to a monitor 20 for remote viewing. From the view projected in monitor 20, level controllers 21, digitizing means (not shown), recording means 22 and data indicator 23 can be manipulated to provide the necessary control and information about the contents of vessel 4. For example, by determining the change in light intensity, particle size can be determined or liquid levels controlled, etc.

The preferred and optimumly preferred embodiments of the present invention have been described herein and shown in the accompanying drawing to illustrate the underlying principles of the invention but it is to be understood that numerous modifications and ramifications may be made without departing from the spirit and scope of this invention.

What is claimed is:

1. A camera viewing unit for viewing the interior of a vessel, comprising in combination a camera, a fixed lens housing, and a vessel attachment means, said fixed lens housing having rotatable connecting means to connect said lens housing to said camera and having means to connect said lens housing to said vessel attachment means, said fixed lens housing comprising a tubular configuration with a back and a front end portion and having at its front portion a fixed lens in visual alignment with a lens of said camera, said rotatable connecting means adapted to move said fixed lens and said fixed lens housing forward and backward to focus thereby, said vessel attachment means having at a forwardmost face a fused lens, said fused lens positioned to have direct contact with an interior of said vessel after said viewing unit is connected thereto.

2. The camera viewing unit of claim 1 wherein said fixed lens housing has a tubular structure with an additional fixed lens on its back end portion.

3. The camera viewing unit of claim 1 wherein said fused lens is constructed of glass, said fused lens is fused to an outside forward metal portion of said vessel attachment means.

4. The camera viewing unit of claim 1 wherein said fixed lens is immediately adjacent said fused lens, said fused lens being on an outside portion of said unit.

5. The camera viewing unit of claim 1 wherein said lens of said camera, said fixed lens and said fused lens are in visual alignment with each other and with an aperture in a vessel when said viewing unit is attached to said vessel.

6. The camera viewing unit of claim 1 wherein said camera is movable forward and backward in relation to said fixed lens housing to thereby focus said camera.

7. The camera viewing unit of claim wherein said fixed lens housing has a threaded section for screwing into an aperture of said camera, said threaded section used to focus said camera.

8. A camera viewing unit for viewing the interior of a vessel comprising in combination a camera, a fixed lens housing and a vessel attachment means, said fixed lens housing having rotatable means for connection to a front lens portion of said camera, said fixed lens housing comprising a tubular configuration with a back end portion and a front end portion and having means for insertion into a central aperture located in said vessel attachment means, said fixed lens housing having connecting means to thereby connect said camera to said vessel attachment means, said fixed lens housing having attached thereto at its front end portion at least one fixed lens in visual alignment with a lens of said camera, and having said rotatable means to move said fixed lens housing with said fixed lens forward and backward to focus thereby, said vessel attachment means having at a forwardmost face a fused lens, said fused lens positioned to have direct contact with the interior of said vessel after said viewing unit is connected thereto.

9. The camera viewing unit of claim 8 wherein said fixed lens housing has a tubular structure with an additional fixed lens attached to its back end portion.

10. The camera viewing unit of claim 8 wherein said fixed lens housing has a tubular structure with a fixed lens on both its said front end and back end portions.

11. The camera viewing unit of claim 8 wherein said fused lens is constructed of glass, said fused lens is fused to an outside forward metal portion of said vessel attachment means.

12. The camera viewing unit of claim 8 wherein said fixed lens is immediately adjacent said fused lens, said fused lens being on an outside portion of said unit.

13. The camera viewing unit of claim 8 wherein said lens of said camera, said fixed lens and said fused lens are in visual alignment with each other and adapted to be in visual alignment with an aperture in said vessel.

14. The camera viewing unit of claim 8 wherein said fixed lens housing is movable forward and backward to thereby focus said camera.

15. The camera viewing unit of claim 8 wherein said fixed lens housing has said rotatable means comprising a threaded section for screwing into an apertured portion of said camera, said threaded section used to focus said camera.

* * * * *